United States Patent
Yamada

(10) Patent No.: US 11,198,087 B2
(45) Date of Patent: Dec. 14, 2021

(54) COLLECTION DEVICE, COLLECTION METHOD, AND FIBROUS FEEDSTOCK RECYCLING DEVICE

(71) Applicant: SEIKO EPSON CORPORATION, Tokyo (JP)

(72) Inventor: Kentaro Yamada, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 278 days.

(21) Appl. No.: 16/266,445

(22) Filed: Feb. 4, 2019

(65) Prior Publication Data

US 2019/0240607 A1  Aug. 8, 2019

(30) Foreign Application Priority Data

Feb. 5, 2018 (JP) .............................. JP2018-017842

(51) Int. Cl.
  *D21B 1/00* (2006.01)
  *B27N 3/04* (2006.01)
  *B01D 46/00* (2006.01)
  *D21B 1/10* (2006.01)
  *D21D 5/06* (2006.01)
  *B01D 46/24* (2006.01)

(52) U.S. Cl.
  CPC ..... *B01D 46/0068* (2013.01); *B01D 46/0019* (2013.01); *B01D 46/24* (2013.01); *B01D 46/2403* (2013.01); *D21B 1/10* (2013.01); *D21D 5/06* (2013.01); *B01D 2279/00* (2013.01)

(58) Field of Classification Search
  CPC ............ B01D 46/0068; B01D 46/0019; B01D 46/24; B01D 46/2403; B01D 2279/00; D21B 1/10; D21D 5/06
  See application file for complete search history.

(56) References Cited

U.S. PATENT DOCUMENTS

2017/0260691 A1* 9/2017 Murayama ............... B65H 5/24

FOREIGN PATENT DOCUMENTS

| JP | 2010-158611 A | 7/2010 |
| JP | 2010260019 A | * 11/2010 |
| JP | 2014-79690 A | 5/2014 |
| JP | 2015166059 A | * 9/2015 |

* cited by examiner

*Primary Examiner* — Ryan M Ochylski
(74) *Attorney, Agent, or Firm* — Oliff PLC

(57) ABSTRACT

Technology improving the effect of cleaning a filter by a high pressure air current is provided. A first dust collector 27 has a housing into which a gas carrying capture material is carried; a filter 240 having a filter element 305 that captures the capture material, and an opening 305b from which air passing through the filter element 305 flows out; and an injector having a nozzle with an injection opening that injects a gas, moves the nozzle to a position in contact with the opening, and injects the gas from the injection opening 305b when the nozzle is in contact with the opening 305b.

6 Claims, 7 Drawing Sheets

COLLECTION DEVICE, COLLECTION METHOD, AND FIBROUS FEEDSTOCK RECYCLING DEVICE

BACKGROUND

1. Technical Field

The present invention relates to a collection device, a collection method, and a fibrous feedstock recycling device.

2. Related Art

Configurations for backwashing filters in a system that captures dust with a filter are known from the literature. JP-A-2014-79690, for example, describes a configuration in which air containing dust is introduced to a casing housing multiple filter elements, and air passing through a filter elements is discharged to the outside through chambers connected to the filter elements. This configuration cleans the filter elements by applying backwash pulses from the chambers to the filter elements.

When an air stream for backwashing the filters flows into the space exposed to the filter in the configuration described in JP-A-2014-79690, pressure is decreased by the air stream flowing into the space, and the pressure of the backwash current dissipates into the space. As a result, the effect of cleaning the filter is limited even when a high pressure air stream is used.

SUMMARY

An objective of the present invention is to improve the cleaning effect by cleaning a filter with a high pressure air current.

To achieve the foregoing objective, a collection device according to the invention includes a housing into which a gas carrying capture material is carried; a filter having a filter element that captures the capture material, and an opening from which air passing through the filter element flows out; and an injector having a nozzle with an injection opening that injects a gas, and is configured to move the nozzle to a position in contact with the opening, and inject the gas from the injection opening when the nozzle is in contact with the opening.

By setting the nozzle against the opening of the filter and injecting gas, the majority of the injected gas passes through the filter and screened material that adheres to the filter can be removed by injection of the gas. As a result, the filter can be cleaned by an air current.

Preferably in a collection device according to another aspect of the invention, the nozzle has a closure configured to contact the opening and close the opening when moved to the opening.

Preferably in a collection device according to another aspect of the invention, the injector has a gas chamber to which a gas is supplied, and in response to pressure of the gas supplied to the gas chamber, expands and moves the nozzle toward the opening.

Preferably in a collection device according to another aspect of the invention, when the nozzle is in contact with the opening, gas supplied to the injector is injected from the injection opening.

Preferably in a collection device according to another aspect of the invention, the injector and the nozzle are connected, and communicate the injection opening with the gas chamber.

Preferably in a collection device according to another aspect of the invention, the injector expands and moves the nozzle when pressure in the gas chamber reaches a first pressure; the nozzle has a valve mechanism that moves the gas from the gas chamber to the injection opening when the pressure in the gas chamber reaches a second pressure; and the second pressure is a pressure greater than the first pressure.

Preferably in a collection device according to another aspect of the invention, the injector has an expansion member disposed integrally with the base of the nozzle, or connected to the base; the expansion member is configured to expand when the pressure in the gas chamber reaches the first pressure; and the nozzle has a valve mechanism held in a closed position by elastic force of a spring member, and when the gas pressure in the gas chamber reaches a second pressure, the spring member deforms and gas is injected from the injection opening.

Preferably, a collection device according to another aspect of the invention has multiple filters in the housing; multiple injectors corresponding to the multiple filters; and a gas supplier configured to supply gas to each of the multiple injectors; and the collection device sequentially selects a specific number of the multiple injectors, and supplies gas from the gas supplier.

Another aspect of the invention is a collection method of a collection device having a housing into which a gas carrying capture material is carried; a filter having a filter element that captures the capture material, and an opening from which air passing through the filter element flows out; and a nozzle with an injection opening that injects a gas; the collection method moving the nozzle to a position in contact with the opening, and injecting the gas from the nozzle when the nozzle is in contact with the opening.

By setting the nozzle against the opening of the filter and injecting gas, the majority of the injected gas passes through the filter and screened material that adheres to the filter can be removed by injection of the gas. As a result, the filter can be cleaned by an air current.

Another aspect of the invention is a fibrous feedstock recycling device including a defibrator configured to defibrate material containing fiber; a separator configured to separate defibrated material defibrated by the defibrator into first screened material containing the fiber, and second screened material containing components smaller than the fiber; a manufacturing device configured to make a recycled product from the first screened material separated by the separator; and a collector configured to capture the second screened material separated by the separator. The collector includes a housing into which a gas carrying the second screened material is carried; a filter having a filter element that captures the second screened material, and an opening from which air passing through the filter element flows out; and an injector having a nozzle with an injection opening that injects a gas; and moves the nozzle to a position in contact with the opening, and injects the gas from the injection opening when the nozzle is in contact with the opening.

By injecting a gas, this aspect of the invention can remove screened material adhering to a filter in a device that defibrates material containing fiber, and captures screened material separated from the defibrated material by the filter. As a result, the filter can be effectively cleaned by an air current.

Other objects and attainments together with a fuller understanding of the invention will become apparent and

DESCRIPTION OF EMBODIMENTS

Preferred embodiments of the invention are described below with reference to the accompanying figures. Note that the embodiments described below do not limit the content of the embodiment described in the accompanying claims. All configurations described below are also not necessarily essential elements of the invention.

1. Embodiment 1

1. General Configuration of a Sheet Manufacturing Apparatus

Figure 1:
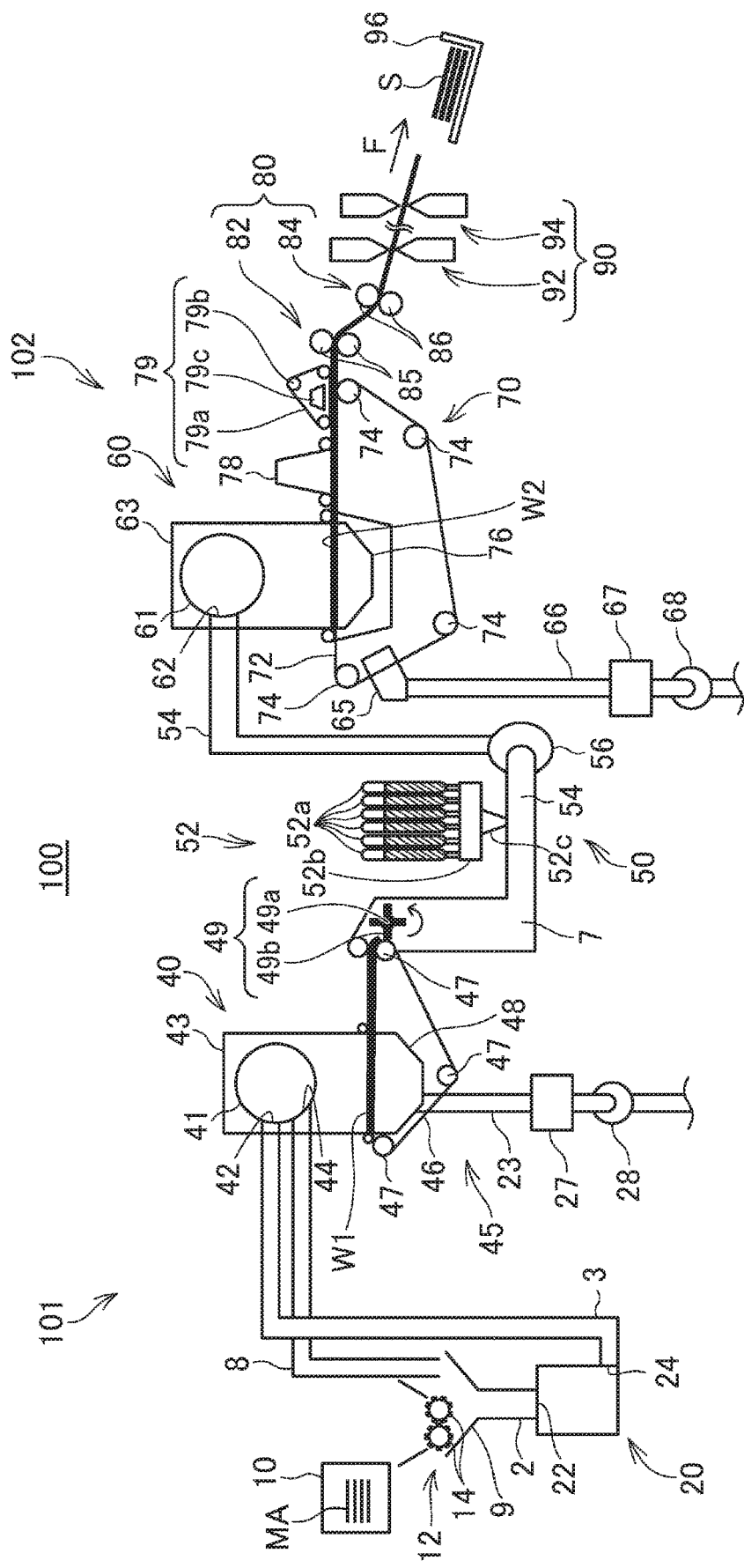
FIG. 1 illustrates the configuration of a sheet manufacturing apparatus.

FIG. 1 schematically illustrates the configuration of a sheet manufacturing apparatus 100 according to the invention.

The sheet manufacturing apparatus 100 is an example of a fibrous feedstock recycling device according to the invention that executes a recycling process of extracting fiber from a feedstock material MA containing fiber and making new sheets S from the fiber. The sheet manufacturing apparatus 100 can make multiple types of sheets S, and by mixing additives with the feedstock material MA according to the application of the sheets S, can adjust the paper strength and whiteness, or add color, scents, or functions such as fire retardancy to the sheets S. The sheet manufacturing apparatus 100 can also adjust the density, thickness, size, and shape of the sheets S. Typical examples of the sheets S include office paper in standard sizes such as A4 or A3, various kinds of sheet products such as cleaning sheets for cleaning flooring, sheets for cleaning up oil and grease, and sheets cleaning toilets, as well as paper plates and other products.

The sheet manufacturing apparatus 100 includes a feedstock feeder 10, shredder 12, defibrator 20, classifier 40, first web former 45, rotor 49, mixing device 50, air-laying device 60, second web former 70, conveyor 79, sheet former 80, and sheet cutter 90. The shredder 12, defibrator 20, classifier 40, and first web former 45 configure a defibration processor 101 that defibrates the feedstock material MA and acquires material used to make the sheets S. The rotor 49, mixing device 50, air-laying device 60, second web former 70, sheet former 80, and sheet cutter 90 configure a sheet maker 102 that processes the material acquired by the defibration processor 101 and makes sheets S.

The feedstock feeder 10 in this example is an automatic sheet feeder that holds and continuously supplies the feedstock material MA to the shredder 12. The feedstock material MA may be any material containing fiber, such as recovered paper, waste paper, and pulp sheets.

The shredder 12 has shredder blades 14 that cut the feedstock material MA supplied by the feedstock feeder 10, shreds the feedstock material MA in air by the shredder blades 14, and produces paper shreds a few centimeters square. The shape and size of the shreds is not specifically limited. A paper shredder, for example, may be used as the shredder 12. The feedstock material MA shredded by the shredder 12 is then collected in a hopper 9, and conveyed through a conduit 2 to the defibrator 20.

The defibrator 20 defibrates the coarse shreds produced by the shredder 12. Defibration is a process of breaking feedstock material MA containing bonded fibers into single fibers or a few intertwined fibers. The feedstock material MA may also be referred to as material to defibrate or defibration material. By the defibrator 20 defibrating the feedstock material MA, resin particles, ink, toner, bleeding inhibitors, and other materials included in the feedstock material MA can be expected to also separate from the fibers. The material that has past through the defibrator 20 is referred to as defibrated material.

In addition to defibrated fibers that have been separated, the defibrated material may contain additives that are separated from the fiber during defibration, including resin, ink, toner, and other color additives, bleeding inhibitors, and paper strengthening agents. The resin particles contained in the defibrated material is resin that is mixed to bind fibers together when the feedstock material MA was manufactured. The shape of the fiber in the defibrated material may be as strings or ribbons. The fiber contained in the defibrated material may be as individual fibers not intertwined with other fibers, or as clumps, which are multiple fibers tangled with other defibrated material into clumps.

The defibrator 20 defibrates in a dry process. A dry process as used herein means that the defibration process is done in air instead of a wet solution. The defibrator 20 uses a defibrator such as an impeller mill in this example. More specifically, the defibrator 20 has a rotor (not shown in the figure), and a liner (not shown in the figure) positioned around the outside of the rotor, and the shreds go between the rotor and the liner and are defibrated.

The shreds are conveyed by an air current from the shredder 12 to the defibrator 20. This air current may be generated by the defibrator 20, or the air current may be produced by a blower (not shown in the figure) disposed upstream or downstream from the defibrator 20 in the conveyance direction of the shreds and defibrated material. The defibrated material is carried by the air current from the defibrator 20 through a conduit 3 to the classifier 40. The air current conveying the defibrated material to the classifier 40 may be generated by the defibrator 20 or the air current from the blower described above may be used.

The classifier 40 separates the components of the defibrated material defibrated by the defibrator 20 by the size of the fiber. The size of the fiber primarily indicates the length of the fiber. The classifier 40 includes a drum 41, and a housing 43 around the drum 41. The drum 41 in this example is a sieve. More specifically, the drum 41 has mesh, a filter or a screen with openings that functions as a sieve. More specifically, the drum 41 is a cylinder that is rotationally driven by a motor, and has mesh in at least part of the outside surface. The mesh of the drum 41 may be a metal screen, expanded metal made by expanding a metal sheet with slits formed therein, or punched metal, for example.

Defibrated material introduced from the inlet 42 to the drum 41 is separated by rotation of the drum 41 into precipitate that passes through the openings in the drum 41, and remnants that do not pass through the openings. The precipitate that passes through the openings contains fiber and particles smaller than the openings, and is referred to as first screened material. The remnants include fibers, undefibrated shreds, and clumps that are larger than the openings, and are referred to as second screened material. The first screened material precipitates inside the housing 43 and descends to the first web former 45. The second screened material is conveyed through a conduit 8 to the defibrator 20 from an exit opening 44 that communicates with the inside of the drum 41. The classifier 40 is an example of a separator.

Instead of using a sieve-type classifier 40, the sheet manufacturing apparatus 100 may use a cyclone classifier, elbow-jet classifier, or eddy classifier, for example, that selects and separates the first screened material and second screened material. Such classifiers may be configured to separate the smallest or low density material from the first screened material. For example, the classifier may be configured to separate and remove from the first screened material resin particles, color agents, and additives that were separated from the fibers by the defibrator 20. In this case, the first screened material can be conveyed to the first web former 45 and mixing device 50 without containing fine particles of resin, color agents, and other additives.

The first web former 45 includes a mesh belt 46, tension rollers 47, and a suction device 48. The mesh belt 46 is an endless metal belt, and is mounted around multiple tension rollers 47. The mesh belt 46 circulates in a path configured by the tension rollers 47. Part of the path of the mesh belt 46 is flat in the area below the drum 41, and the mesh belt 46 forms a flat surface.

Numerous openings are formed in the mesh belt 46. Of the first screened material that descends from the drum 41 located above the mesh belt 46, components that are larger than the openings in the mesh belt 46 accumulate on the mesh belt 46. Components of the first screened material that are smaller than the openings in the mesh belt 46 pass through the openings. The components that pass through the openings in the mesh belt 46 are referred to as third screened material. The third screened material contains fibers in the defibrated material that are shorter than the openings in the mesh belt 46, as well as resin particles, and particles of ink, toner, bleeding inhibitors and other material that is separated from the fibers by the defibrator 20.

The suction device 48 pulls air from below the mesh belt 46. The suction device 48 is connected through a conduit 23 to a first dust collector 27. The first dust collector 27 removes the third screened material from the air current. The configuration of the first dust collector 27 is described below. Downstream from the first dust collector 27 is a first collection blower 28, and the first collection blower 28 suctions air from the first dust collector 27 and discharges the air through a conduit 29 to the outside of the sheet manufacturing apparatus 100.

Because air is suctioned from the suction device 48 through the first dust collector 27 by the first collection blower 28, the third screened material is captured by the first dust collector 27. Because the first screened material descending from the drum 41 is pulled by the air current suctioned by the suction device 48 to the mesh belt 46, the air current has the effect of promoting accumulation of the first screened material on the mesh belt 46.

The material accumulated on the mesh belt 46 forms a first web W1. More specifically, the first web former 45 forms a first web W1 from the first screened material selected by the classifier 40.

Of the components of the first screened material, the first web W1 comprises mainly fibers that are larger than the openings in the mesh belt 46, and is a fluffy web containing much air. The first web W1 is conveyed by movement of the mesh belt 46 to the rotor 49.

The rotor 49 has a base 49a connected to a driver such as a motor (not shown in the figure), and fins 49b protruding from the base 49a, and when the base 49a turns in direction of rotation R indicated by the arrow, the fins 49b rotate around the base 49a. The fins 49b in this example are flat blades. In the example in FIG. 1, there are four fins 49b disposed equidistantly around the base 49a.

The rotor 49 is disposed at the end of the flat part of the path of the mesh belt 46. Because the path of the mesh belt 46 curves down at this end, the mesh belt 46 also curves and moves down. As a result, the first web W1 conveyed by the mesh belt 46 extends forward from the mesh belt 46 and contacts the rotor 49. The first web W1 is then broken up by the fins 49b striking the first web W1, and reduced to small clumps of fiber. These clumps then travel through the conduit 7 located below the rotor 49, and are conveyed to the mixing device 50. Because the first web W1 is a soft, fluffy structure of fiber accumulated on the mesh belt 46 as described above, the first web W1 is easily broken up by collision with the rotor 49.

The rotor 49 is positioned so that the fins 49b can contact the first web W1 but the fins 49b do not touch the mesh belt 46. The distance between the fins 49b and the mesh belt 46 at the closest point is preferably greater than or equal to 0.05 mm and less than or equal to 0.5 mm.

The mixing device 50 mixes the first screened material with an additive. The mixing device 50 has an additive supplier 52 that supplies an additive, a conduit 54 through which the first screened material and additive flow, and a mixing blower 56.

One or more additive cartridges 52a storing additives are installed to the additive supplier 52. The additive cartridges 52a may be removably installed to the additive supplier 52. The additive supplier 52 includes an additive extractor 52b that extracts additive from the additive cartridges 52a, and an additive injector 52c that injects the additive extracted by the additive extractor 52b into the conduit 54.

The additive extractor 52b has a feeder (not shown in the figure) that feeds additive in a powder or particulate form from inside the additive cartridges 52a, and removes additive from some or all of the additive cartridges 52a. The additive removed by the additive extractor 52b is conveyed to the additive injector 52c.

The additive injector 52c holds the additive removed by the additive extractor 52b. The additive injector 52c has a shutter (not shown in the figure) that opens and closes the connection to the conduit 54, and when the shutter is open, the additive extracted by the additive extractor 52b is fed into the conduit 54.

The additive supplied from the additive supplier 52 includes resin (binder) that binds multiple fibers together when heated. The resin contained in the additive melts when passing through the sheet former 80 and binds multiple fibers together. The resin may be a thermoplastic resin or thermoset resin, such as AS resin, ABS resin, polypropylene, polyethylene, polyvinyl chloride, polystyrene, acrylic resin, polyester resin, polyethylene terephthalate, polyethylene ether, polyphenylene ether, polybutylene terephthalate, nylon, polyimide, polycarbonate, polyacetal, polyphenylene sulfide, and polyether ether ketone. These resins may be used individually or in a desirable combination.

The additive supplied from the additive supplier 52 may contain components other than resin for binding fibers. For example, depending on the type of sheet being manufactured, the additive also include a coloring agent for coloring the fiber, an anti-blocking agent to prevent agglomeration of fibers and agglomeration of resin, or a flame retardant for making the fiber difficult to burn. The additive may also be in the form of fibers or particles.

The mixing blower 56 produces an air current flowing through a conduit 54 connecting 7 to the air-laying device 60. The first screened material conveyed from the 7 into the conduit 54, and the additive supplied by the additive supply device 52 to the conduit 54, are mixed as they pass through the mixing blower 56.

The mixing blower 56 in this example can be configured with a motor (not shown in the figure), blades (not shown in the figure) that turn as driven by the motor, and a case (not shown in the figure) housing the blades, and may be a configuration in which the blades and case are connected. In addition to blades for producing an air current, the mixing blower 56 may also include a mixer for mixing the first screened material and the additive. The mixture combined by the mixing device 50 is then conveyed by the air current produced by the mixing blower 56 to the air-laying device 60, and introduced through the inlet 62 to the air-laying device 60.

The air-laying device 60 detangles and causes the fibers in the mixture to disperse in air while precipitating to the second web former 70. If the additive supplied from the additive supply device 52 is fibrous, these additive fibers are also detangled by the air-laying device 60 and descend to the second web former 70.

The air-laying device 60 includes a drum 61, and a housing 63 that houses the drum 61. The drum 61 is a cylindrical structure configured similarly to the drum 41, for example, rotates as driven by a motor (not shown in the figure) similarly to the drum 41, and functions as a sieve. The drum 61 has openings, and the mixture detangled by rotation of the drum 61 falls through the openings.

The second web former 70 is located below the drum 61. The second web former 70 in this example includes a mesh belt 72, tension rollers 74, and a suction mechanism 76.

The mesh belt 72 is an endless metal belt similar to the mesh belt 46 described above, and is mounted around multiple tension rollers 74. The mesh belt 72 circulates in a path configured by the tension rollers 74. Part of the path of the mesh belt 72 is flat in the area below the drum 61, and the mesh belt 72 forms a flat surface. There are also many holes in the mesh belt 72.

Of the mixture falling from the drum 61 located above the mesh belt 72, components larger than the openings in the mesh belt 72 accumulate on the mesh belt 72. Components of the mixture that are smaller than the openings in the mesh belt 72 pass through the holes.

The suction mechanism 76 has a blower not shown, and suctions air from the opposite side of the mesh belt 72 as the drum 61. Material that passes through the openings in the mesh belt 72 is suctioned by the suction mechanism 76. The air current suctioned by the suction mechanism 76 pulls the mixture falling from the drum 61 to the mesh belt 72, and effectively promotes accumulation of the mixture. The air current suctioned by the suction mechanism 76 creates a down flow in the path of the mixture descending from the drum 61, and can be expected to have the effect of preventing precipitating fibers from becoming tangled. The mixture accumulated on the mesh belt 72 is laid in a web, forming a second web W2.

A wetting device 78 is disposed to the conveyance path of the mesh belt 72 downstream from the air-laying device 60. The wetting device 78 is a mist humidifier that produces and supplies a water mist to the mesh belt 72. The wetting device 78 in this example has a tank that holds water, and an ultrasonic vibrator that converts the water to mist. Because the moisture content of the second web W2 can be adjusted by the mist supplied by the wetting device 78, the mist can be expected to suppress accretion of fiber on the mesh belt 72 due to static electricity.

The second web W2 is then conveyed by the conveyor 79, separates from the mesh belt 72, and is conveyed to the sheet former 80. The conveyor 79 in this example has a mesh belt 79*a*, rollers 79*b*, and a suction mechanism 79*c*. The suction mechanism 79*c* has a blower (not shown in the figure), and produces an air current upward through the mesh belt 79*a* by the suction of the blower. The second web W2 is separated from the mesh belt 72 and pulled to the mesh belt 79*a* by this air current. The mesh belt 79*a* moves by rotation of the rollers 79*b*, and conveys the second web W2 to the sheet former 80.

Like mesh belt 46 and mesh belt 72 described above, the mesh belt 79*a* may be configured with an endless metal belt having openings.

A belt cleaning mechanism 65 is also disposed to the second web former 70. The belt cleaning mechanism 65 is disposed to a part of the circulation path of the mesh belt 72. As shown in FIG. 1, the belt cleaning mechanism 65 is disposed to the conveyor 79 downstream from the position where the second web W2 separates from the mesh belt 72, and upstream from the air-laying device 60. The belt cleaning mechanism 65 is preferably disposed to a position adjacent to the air-laying device 60.

The belt cleaning mechanism 65 is configured to cause resin and other particles adhering to the mesh belt 72 to fall away from the mesh belt 72, and recover the separated particles. The belt cleaning mechanism 65 may include, for example, a brush (not shown in the figure) that wipes fiber and particles from the mesh belt 72, and a hopper (not shown in the figure) that collects the fiber and particles wiped off by the brush, and a conduit 66 connected to the hopper (not shown in the figure).

A second collection blower 68 is connected to the conduit 66 through the second dust collector 67.

The second collection blower 68 suctions air through the second dust collector 67, and fiber and parts wiped off the mesh belt 72 by the belt cleaning mechanism 65 are vacuumed from the belt cleaning mechanism 65 through the conduit 66. The air current flowing through the conduit 66 passes through the second dust collector 67. The second collection blower 68 has a filter (not shown in the figure), and separates and captures fiber and particles from the air flowing in from the conduit 66. The second collection blower 68 discharges the air that passes through the second dust collector 67 to the outside of the sheet manufacturing apparatus 100.

The conduit 66, second dust collector 67, and second collection blower 68 may be configured the same as the conduit 23, first dust collector 27, and first collection blower 28 described above.

By applying heat to the second web W2, the sheet former 80 binds fibers recovered from the first screened material and contained in the second web W2 through the resin contained in the additive.

The sheet former 80 has a compression device 82 that compresses the second web W2, and a heating device 84 that heats the second web W2 after compression by the compression device 82.

The compression device 82 comprises a pair of calender rolls 85. The compression device 82 has a hydraulic press mechanism (not shown in the figure) that applies nip pressure to the calender rolls 85, and a motor or other driver (not shown in the figure) that causes the calender rolls 85 to rotate in the direction of the heating device 84. The compression device 82 compresses and conveys the second web W2 to the heating device 84 with a specific nip pressure by the calender rolls 85.

The heating device 84 includes a pair of heat rollers 86. The heating device 84 also has a heater (not shown in the figure) that heats the surface of the heat rollers 86 to a specific temperature, and a motor or other driver (not shown in the figure) that causes the heat rollers 86 to rotate in the direction of the sheet cutter 90. The heating device 84 holds and heats the second web W2 compressed to a high density by the compression device 82, and conveys the heated second web W2 to the sheet cutter 90. The second web W2 is heated in the heating device 84 to a temperature greater than the glass transition temperature of the resin contained in the second web W2, forming a sheet S.

The sheet cutter 90 cuts the sheet S formed by the sheet former 80. In this example, the sheet cutter 90 has a first cutter 92 that cuts the sheet S crosswise to the conveyance direction of the sheet S indicated by the arrow F in the figure, and a second cutter 94 that cuts the sheet S parallel to the conveyance direction F. The sheet cutter 90 cuts the length and width of the sheet S to a specific size, forming single sheets. The single sheets S cut by the sheet cutter 90 are then stored in the discharge tray 96. The discharge tray 96 may be a tray or stacker for holding the manufactured sheets, and the sheets S discharged to the tray can be removed and used by the user.

Parts of the sheet manufacturing apparatus 100 embody a defibration processor 101 and a sheet maker 102. The defibration processor 101 includes at least the defibrator 20, and may include the classifier 40 and first web former 45.

The defibration processor 101 makes defibrated material from feedstock material MA, or forms the defibrated material into a web configuration to make a first web W1. The work product of the defibration processor 101 may be conveyed through the rotor 49 to the mixing device 50, or removed from the sheet manufacturing apparatus 100 without passing through the rotor 49 and stored. This work product can also be sealed in specific packages in a form ready for shipping or sale.

The sheet maker 102 is a functional device for making the work product manufactured by the defibration processor 101 into sheets S, and may be referred to as a processor. The sheet maker 102 includes the mixing device 50, air-laying device 60, second web former 70, conveyor 79, sheet former 80 and sheet cutter 90, and may also include the rotor 49. The sheet maker 102 may also include the additive supply device 52.

The sheet manufacturing apparatus 100 may be configured with the defibration processor 101 and sheet maker 102 as a single integrated system, or with the defibration processor 101 and sheet maker 102 separate. In this case, the defibration processor 101 is an example of a fibrous feedstock recycling device according to the invention. The sheet maker 102 is an example of a sheet forming device that processes defibrated material into sheets. Each of these components may also be conceived of as processing devices.

1-2. First Dust Collector Configuration

Figure 2:
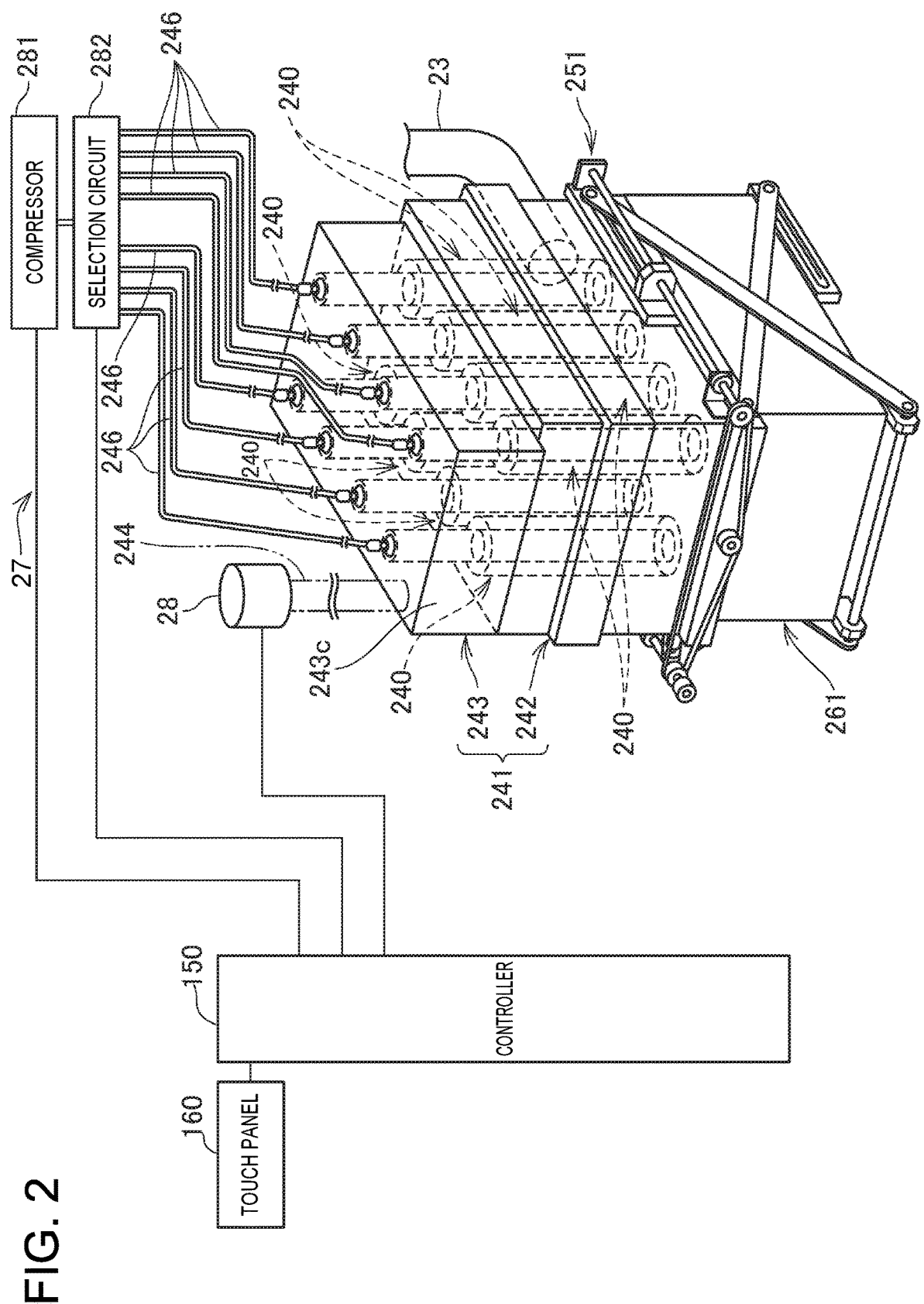
FIG. 2 shows the configuration of a first dust collector.
Figure 3:
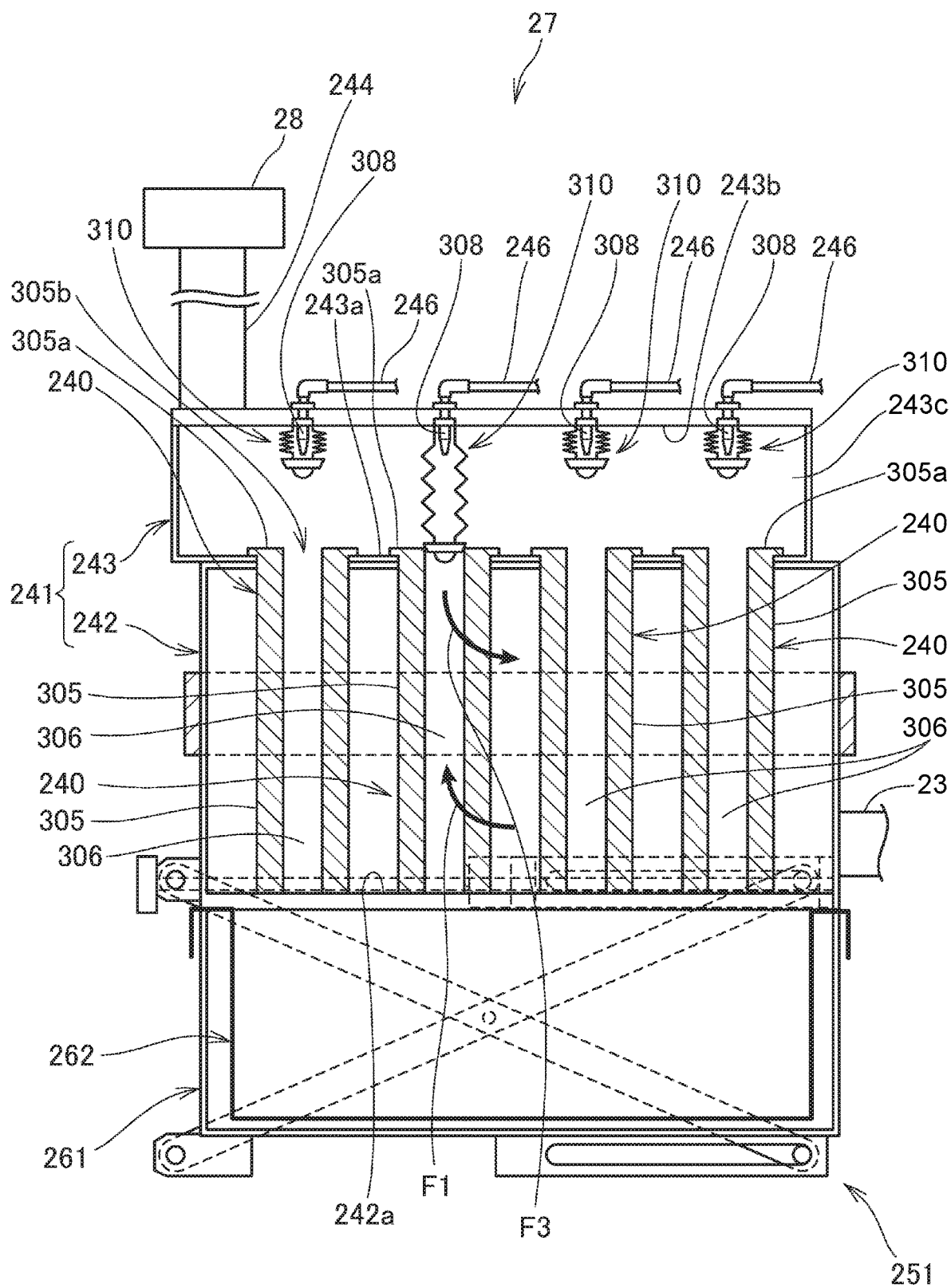
FIG. 3 is a section view showing the internal structure of the first dust collector.

FIG. 2 illustrates the first dust collector 27 and surrounding configurations. FIG. 3 shows the internal structure of the first dust collector 27.

As shown in FIG. 2, the sheet manufacturing apparatus 100 has a controller 150 (FIG. 2) that controls parts of the sheet manufacturing apparatus 100. The controller 150 is configured by a processor that runs a control program to control the sheet manufacturing apparatus 100. The processor may be a CPU (Central Processing Unit), or microprocessor, for example. The controller 150 may also include ROM (read-only memory) storing programs executed by the processor, and RAM (random access memory) used as a work area. The controller 150 may also be a system chip including a processor, ROM, RAM, and other devices.

The controller 150 connects to parts of the sheet manufacturing apparatus 100, and controls the operation of those parts. In FIG. 2, the objects controlled by the controller 150 are the first collection blower 28, touch panel 160, compressor 281, and selection circuit 282.

The touch panel 160 is disposed on the front of the sheet manufacturing apparatus 100 housing (not shown in the figure), and includes a display screen for displaying windows related to the operating state of the sheet manufacturing apparatus 100 and operation settings, and a touch sensor for detecting touch operations. The touch panel 160 displays the content of settings related to sheet manufacturing apparatus 100 operation as controlled by the controller 150, and receives input related to sheet manufacturing apparatus 100 settings.

The compressor 281 and selection circuit 282 are part of the first dust collector 27.

The compressor 281 compresses air pulled in from outside the sheet manufacturing apparatus 100, and supplies compressed air. The compressor 281 may also have an air tank to store compressed air. The selection circuit 282 supplies the compressed air supplied by the compressor 281 to the housing 241 of the first dust collector 27. Operation of the selection circuit 282 is described below. The compressor 281 is an example of an air supply device.

As shown in FIG. 2 and FIG. 3, the first dust collector 27 has a housing 241 that is the main casing of the first dust collector 27, and a collection chamber 261 in which the third screened material captured by the housing 241 is recovered and stored. The collection chamber 261 is connected by a lift mechanism 251 to move up and down relative to the housing 241. The first dust collector 27 is an example of a collection device and a collector.

The housing 241 includes a first housing 242 that holds multiple filters 240, and a second housing 243 disposed above the first housing 242 and forming a chamber into which flows the air from which the third screened material was removed by the filters 240.

Conduit 23 connects to the first housing 242. The conduit 23 communicates with the space around the filters 240 inside the first housing 242, and the air current containing the third screened material flows from the conduit 23 into the first housing 242.

Another conduit 244 connects to the second housing 243. This conduit 244 is a hollow tube that communicates with the internal space 243c of the second housing 243, and connects to the first collection blower 28. The first collection blower 28 suctions air from the internal space 243c through the conduit 244.

The internal space 243c is positioned downstream from the filters 240 in the path of the air current through the conduit 23, first dust collector 27, and first collection blower 28. The first collection blower 28 suctions the air from which the third screened material was removed by the filters 240.

Spaces are provided inside the first housing 242 between the multiple filters 240. The number and placement of the filters 240 may be changed as desired, and this embodiment illustrates a configuration of eight filters 240 disposed inside the first housing 242.

Each of the filters 240 has a hollow tubular filter member 305 with an opening 305b in the top 305a of the filter member 305. The filter member 305 may be of any appropriate shape and size, are cylindrical in this example, and the opening 305b is a round hole.

The internal space 306 of the filter member 305 communicates through the opening 305b with the internal space 243c.

Suction produced by the first collection blower 28 causes air containing the third screened material introduced from the conduit 23 to the first housing 242 to pass through the filter member 305 as indicated by air current F1 in FIG. 3. The third screened material is thus captured by the filter member 305, and air from which the third screened material has been removed therefore flows into the internal space 306 of the filter member 305. This air then flows through the opening 305b into the internal space 243c.

The collection chamber 261 is located below the filters 240. A dust bag 262 is held inside the collection chamber 261. The top of the dust bag 262 is secured to the inside of the collection chamber 261 with the top open.

The third screened material captured by the filter member 305 clings to the outside of the filter member 305, or falls away from the outside of the filter member 305 by the force of gravity. Third screened material falling away from the filter member 305 drops into the dust bag 262 below. The first dust collector 27 can therefore recover third screened material suctioned by the suction device 48 in the dust bag 262.

The space inside the first dust collector 27 is divided by the filter members 305 into a clean side and a dirty side. The upstream side of the filter member 305 in the path of the air current F1 is the dirty side, and the conduit 23 connects to the dirty side. The space outside the filter member 305, and the collection chamber 261, are on the dirty side. The downstream side of the filter member 305 in the path of the air current F1 is the clean side. The internal space 306, internal space 243c, and conduit 244 are on the clean side, and the first collection blower 28 connects to the clean side.

The sheet manufacturing apparatus 100 also has a backwash mechanism for backwashing the third screened material captured by the filters 240 and cleaning the filters 240.

Backwashing as used here means an operation, process, or step of causing third screened material adhering to the filter member 305 to separate from the filter member 305 by means of a backwash current F3 flowing in the opposite direction as the air current F1. The third screened material removed from the filter member 305 or dispersed by the backwash current F3 descends and is collected in the dust bag 262.

This backwash mechanism includes the compressor 281, selection circuit 282, a compressed air nozzle 308, and an injector 310.

A compressed air nozzle 308 is disposed to each of the eight filters 240. The compressed air nozzle 308 connects to the selection circuit 282 through an air tube 246 that carries compressed air. Because an air tube 246 is connected to each compressed air nozzle 308, eight air tubes 246 are connected to the selection circuit 282. Note that one air tube 246 may be configured to branch and connect to multiple compressed air nozzles 308. The number of air tubes 246 connected to the selection circuit 282 is therefore one or more, but there are preferably multiple air tubes 246 in order to use the selection function of the selection circuit 282, and the number of air tubes 246 is further preferably equal to at least half the number of compressed air nozzles 308.

The selection circuit 282 selects from among the multiple air tubes 246 one or more air tubes 246 to supply compressed air as controlled by the controller 150.

More specifically, the selection circuit 282 has a line (not shown in the figure) through which compressed air is supplied from the compressor 281, and branch lines (not shown in the figure) that connect the supply line to the individual air tubes 246. The selection circuit 282 also has an actuator (not shown in the figure) that connects the branch lines to the line connected to the compressor 281. This actuator operates as controlled by the controller 150.

By operating the actuator (not shown in the figure), the selection circuit 282 selectively connects the compressor 281 to one or more air tubes 246. As a result, compressed air is supplied to the selected air tubes 246.

The compressed air nozzle 308 is a nozzle that sprays compressed air supplied through the air tube 246 into the internal space 243c. An compressed air nozzle 308 is disposed to the compressed air nozzle 308. The injector 310, as described below, is a mechanical device that operates by the pressure of the compressed air discharged from the compressed air nozzle 308, feeds the compressed air into the internal space 306, and creates the backwash current F3.

The controller 150 thus selects multiple filters 240 in the housing 241 and produces a backwash current F3 by operating the compressor 281 to produce compressed air and controlling the selection circuit 282 to select desired air tubes 246. The controller 150 can therefore select the filters 240 of the first dust collector 27, produce a backwash current F3, and backwash the filters 240. As a result, of the filters 240 in the first dust collector 27, one or multiple filters 240 can be sequentially selected and backwashed. The compressed air supplied by the compressor 281 can therefore be concentrated on one or a few filters 240, stabilizing the velocity and/or pressure of the backwash current F3 at a high rate, and effectively backwash the filters 240.

The compressed air nozzles 308 and injectors 310 are disposed in the internal space 243c at positions opposite the openings 305b. The injector 310 is compressed (retracted) when the compressed air nozzle 308 is not discharging compressed air. Because the injector 310 and the inside of the opening 305b are separated, air flow inside the internal space 243c is not obstructed. For the compressed air nozzle 308 to discharge compressed air, the injector 310 extends toward the opening 305b until the distal end of the injector 310 reaches the opening 305b. In FIG. 3, one injector 310 is extended and the other injectors 310 are retracted. When the distal end of the injector 310 has reached the opening 305b, the compressed air discharged from the compressed air nozzle 308 is guided by the injector 310 into the opening 305b, producing a backwash current F3 in the internal space 306.

Figure 4:
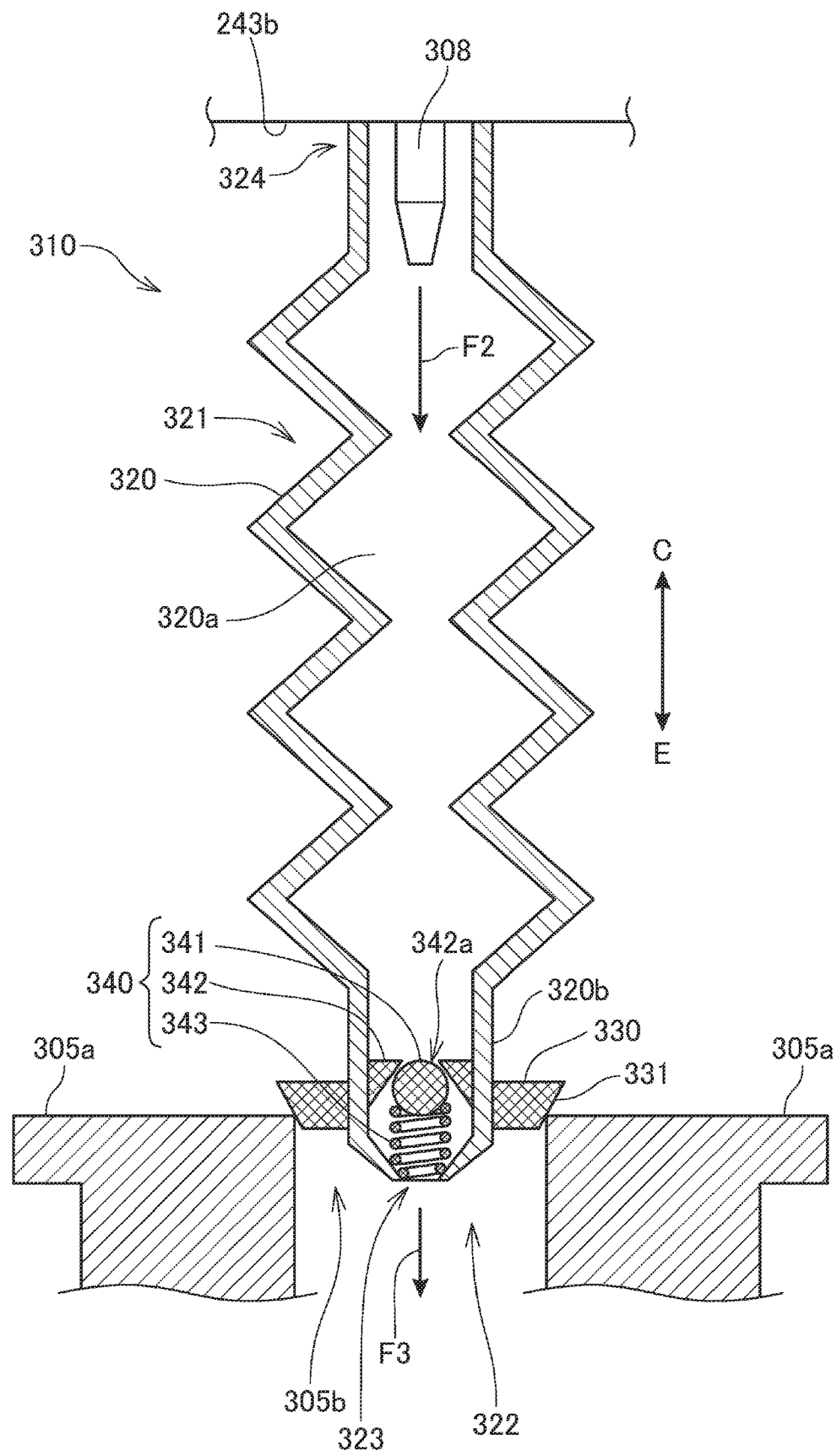
FIG. 4 is a section view showing main parts of the configuration of a first embodiment of an injector.

FIG. 4 is a section view of the main parts in the configuration of the injector 310, and is a vertical section view along the long axis of the injector 310.

The injector 310 has an expandable duct 320 that can expand and contract. The expandable duct 320 is a hollow duct made of a flexible material such as a synthetic resin (including elastomers), rubber, or a thin, flexible metal sheet, and has an accordion-like bellows 321. The bellows 321 can expand and contract in response to an external force. The base 324 to which the bellows 321 connects may also expand and contract.

The space inside the expandable duct 320 is an air chamber 320a into which compressed air from the compressed air nozzle 308 is injected. The expandable duct 320 may be round or oval in horizontal section, or it may be rectangular. The expandable duct 320 is an example of an expansion member.

When the compressed air nozzle 308 does not inject compressed air, the bellows 321 is held in the retracted position. More specifically, the bellows 321 is flexible in the compression direction (in the direction of arrow C). When the compressed air nozzle 308 injects compressed air and the pressure in the air chamber 320a increases, the bellows 321 expands in the direction of arrow E in resistance to the contraction force as a result of its flexibility. The pressure of the air chamber 320a required to cause the bellows 321 to expand (that is, the pressure inside the air chamber 320a) is referred to as a first pressure.

The base 324 of the bellows 321 is affixed to the top 243b of the second housing 243. The compressed air nozzle 308 is disposed passing through the top 243b and protruding into the internal space 243c and exposed to the inside of the air chamber 320a.

An injection nozzle 322 is formed on the distal end of the expandable duct 320. The injection nozzle 322 is configured as a member separate from the bellows 321, and may be connected to the bellows 321 or the injection nozzle 322 may be formed in unison with the bellows 321.

The distal end of the injection nozzle 322 is tapered, and an injection opening 323 is formed in the distal end. A seal 330 is attached to the outside of the injection nozzle 322. The seal 330 is also tapered, narrowing to the distal end side of the expandable duct 320, and the seal face 331, which is the tapered surface, is made from a flexible material such as a synthetic resin (including elastomers) or rubber, forming a seal. The entire seal 330 may also be made from a flexible material. The seal 330 is circular in section, and may be a gasket or packing member. The seal 330 is an example of a closure. If the distal end of the injection nozzle 322 is tapered, the directivity of the backwash current F3 can be improved. If the opening in the distal end of the injection nozzle 322 is shaped to become wider, the backwash current F3 can be dispersed.

The injection nozzle 322 also has a tubular part 320b on the bellows 321 side. The tubular part 320b is a straight, hollow tube. The seal 330 has a round hole matching the outside diameter of the tubular part 320b, and the tubular part 320b is fit into and secured by this hole.

A valve 340 is disposed inside the injection nozzle 322, that is, in the distal end of the air chamber 320a. The valve 340 includes a valving element 341, valve seat 342, and spring member 343. The valve 340 is an example of a valve mechanism. The valving element 341 in this example is a ball, and the valve seat 342 is positioned on the air chamber 320a side of the valving element 341.

The valve seat 342 has a round valve opening 342a, and the valve opening 342a is closed by contact with the valving element 341. The shape of the valving element 341 and valve seat 342 may be configured in any way enabling the valving element 341 to close the valve opening 342a. The valving element 341 and valve seat 342 are preferably made from a flexible material such as a synthetic resin (including elastomers) or rubber, or aluminum, copper, alloys thereof (such as brass), or other metal.

The valving element 341 is urged by the spring member 343 to the valve seat 342 side. More specifically, the spring member 343 is an urging member located in the air chamber 320a and urging the valving element 341 to the valve seat 342, and in this example is a compression spring. The spring member 343 in this example is a metal compression spring or other type of compression spring made from a flexible material.

The valve 340 opens and closes the path of air flow between the air chamber 320a and the injection opening 323. The valve 340 is configured to allow air to flow through the valve opening 342a, and the valve opening 342a is closed by the valving element 341 by the elasticity of the spring member 343. When the pressure in the air chamber 320a is high, the valving element 341 moves toward the injection opening 323 in resistance to the urging force of the spring member 343, and the valve opening 342a opens. The pressure in the air chamber 320a required to move the valving element 341 to the injection opening 323 side is referred to below as a second pressure.

1-3. Injector Operation

When compressed air is supplied from the selection circuit 282 to the air tube 246 as controlled by the controller 150, the compressed air nozzle 308 injects air current F2 into the air chamber 320a. The path from the distal end of the air chamber 320a to the injection opening 323 is closed by the valve 340, and the second pressure described above is greater than the first pressure. As a result, the pressure inside the air chamber 320a increases. When the pressure in the air chamber 320a reaches the first pressure, the bellows 321 expands and moves the injection nozzle 322 toward the opening 305b. In this operation, the bellows 321 functions as a moving mechanism causing the injection nozzle 322 to move.

When the seal 330 contacts the top 305a of the filter member 305 as a result of the bellows 321 expanding, further expansion of the bellows 321 is restricted. Because the bellows 321 does not expand thereafter, the pressure inside the air chamber 320a increases if the compressed air nozzle 308 continues injecting compressed air. As a result, when the pressure in the air chamber 320a reaches the second pressure, the valving element 341 moves to the injection opening 323 side, and the valve opening 342a opens. As a result, compressed air is injected from the injection opening 323. Because the air chamber 320a is pressurized to the second pressure, the pressure of the compressed air injected from the injection opening 323 is high.

With the seal 330 in contact with the top 305a, the seal face 331 contacts the edge of the opening 305b. Because the seal face 331 is pushed against the top 305a by the pressure in the air chamber 320a, the opening 305b is closed by the seal 330. As a result, the majority of the backwash current F3 is sent into the internal space 306 without leaking into internal space 243c, and removes the third screened material from the filter member 305.

As described above, the first dust collector 27 according to the first embodiment of the invention has a housing 241 into which flows an air current carrying third screened material, which is material to be captured; and a filter member 305 that captures the third screened material.

The first dust collector 27 also has filters 240 that have an opening 305b from which the air current passing through the filter member 305 flows out.

The first dust collector 27 also has an injector 310 with an injection nozzle 322 having an injection opening 323 for injecting a gas (air in this example), and moves the injection nozzle 322 to a position contacting the opening 305b.

The first dust collector 27 injects the gas from the injection opening 323 with the injection nozzle 322 in contact with the opening 305b.

By setting the injection nozzle in contact with the opening 305b of the filter member 305 and injecting the gas, this configuration passes the majority of the injected gas through the filter member 305, and third screened material adhering to the filter member 305 can be separated from the filter member 305 by the injection of gas. As a result, the filter member 305 can be effectively cleaned by the air current.

The injection nozzle 322 of the first dust collector 27 in this sheet manufacturing apparatus 100 also has a seal 330 that contacts the opening 305b and closes the opening 305b when the injection nozzle 322 moves to the opening 305b. As a result, third screened material adhering to the filter member 305 can be effectively removed from the filter member 305 by the pressure of the backwash current F3 because the majority of the backwash current F3 injected by the injection opening 323 flows into the internal space 306.

The injector 310 has an air chamber 320a into which a gas can be injected, and expands due to the pressure of the gas injected to the air chamber 320a, causing the injection nozzle 322 to move toward the opening 305b. There is, therefore, no need to apply a dedicated force to move the expandable duct 320, and the injector 310 can be operated by the pressure of the air current F2 the compressed air nozzle 308 injects. Complicating the device configuration can therefore be avoided.

Furthermore, because compressed air supplied to the injector 310 is injected from the injection opening 323 with the injection nozzle 322 in contact with the opening 305b, third screened material adhering to the filter member 305 can be effectively removed from the filter member 305 by the pressure of the backwash current F3.

Furthermore, because the bellows 321 and injection nozzle 322 are connected, and the injection opening 323 communicates with the air chamber 320a, the backwash current F3 the compressed air nozzle 308 injects can efficiently flow as the backwash current F3 into the internal space 306.

In addition, when the pressure inside the air chamber 320a reaches the first pressure, the injector 310 expands, causing the injection nozzle 322 to move. The injection nozzle 322 has a valve mechanism that, when the pressure inside the air chamber 320a reaches the second pressure, causes gas to move from the air chamber 320a to the injection opening 323. The second pressure is a higher pressure than the first pressure. As a result, the pressure of the air current F2 causes the bellows 321 to expand, and backwash current F3 can be injected to the internal space 306 after the injection nozzle 322 contacts the top 305a. As a result, the pressure of the air current F2 can be efficiently used to clean the filter member 305.

The injector 310 has a bellows 321 that is disposed integrally to the base of the injection nozzle 322 or is connected to the injection nozzle 322. The bellows 321 is configured to expand when the pressure inside the air chamber 320a reaches the first pressure. The injection nozzle 322 has a valve mechanism that is held closed by the elastic force of a spring member, and when the pressure inside the air chamber 320a reaches the second pressure, the spring member deforms and gas is injected from the injection opening 323.

The injector 310 may be configured with the bellows 321 connected to the base of the injection nozzle 322. In this configuration, the bellows 321 is configured to expand when the pressure inside the air chamber 320a reaches the first pressure. The injection nozzle 322 has a valve mechanism that is held closed by the elastic force of a spring member, and when the pressure inside the air chamber 320a reaches the second pressure, the spring member deforms and gas is injected from the injection opening 323.

The first dust collector 27 also has multiple filter members 305 inside a housing 241, and multiple injectors 310 corresponding to each of the filter members 305.

The first dust collector 27 also has a selection circuit 282 that supplies gas to each of the multiple injectors 310, sequentially selects a specific number of the multiple injectors 310, and supplies gas from the selection circuit 282. As a result, the multiple filter members 305 of the first dust collector 27 can be sequentially cleaned. The number of filter members 305 to which compressed air is supplied from the compressor 281 can also be limited. As a result, the pressure and volume of the compressed air the compressor 281 supplies can be concentrated in a limited number of internal spaces 306, and a backwash current F3 of a greater pressure and greater volume can be applied to the filter members 305. The multiple filter members 305 can therefore be cleaned more effectively.

The collection method using the first dust collector 27 moves the injection nozzle 322 to a position contacting the opening 305b, and injects gas from an injection nozzle 322 when the injection nozzle 322 is in contact with the opening 305b.

By setting the injection nozzle in contact with the opening 305b of the filter member 305 and injecting the gas, this method passes the majority of the injected gas through the filter member 305, and third screened material adhering to the filter member 305 can be separated from the filter member 305 by the injection of gas. As a result, the filter member 305 can be effectively cleaned by the air current.

The sheet manufacturing apparatus 100 also has a defibrator 20 that defibrates feedstock material MA containing fiber, and a classifier 40 that separates defibrated material defibrated by the defibrator 20 into first screened material containing fiber, and second screened material containing material smaller than the fibers.

The sheet manufacturing apparatus 100 also has a sheet maker 102 configured to make sheets S as a recycled product from the first screened material separated by the classifier 40, and a first dust collector 27 that captures the second screened material separated by the classifier 40, that is, third screened material.

The first dust collector 27 has a housing 241 into which an air current carrying the third screened material flows, and a filter member 305 that captures the third screened material. The first dust collector 27 also has filters 240 that have an opening 305b from which the air current passing through the filter member 305 flows out.

The first dust collector 27 also has an injector 310 with an injection nozzle 322 having an injection opening 323 for injecting a gas (air in this example), and moves the injection nozzle 322 to a position contacting the opening 305b.

The first dust collector 27 injects the gas from the injection opening 323 with the injection nozzle 322 in contact with the opening 305b. As a result, material adhering to the filter member 305 can be separated from the filter member 305 by the injection of gas, and the filter member 305 can be effectively cleaned by the air current.

2. Embodiment 2

Figure 5:
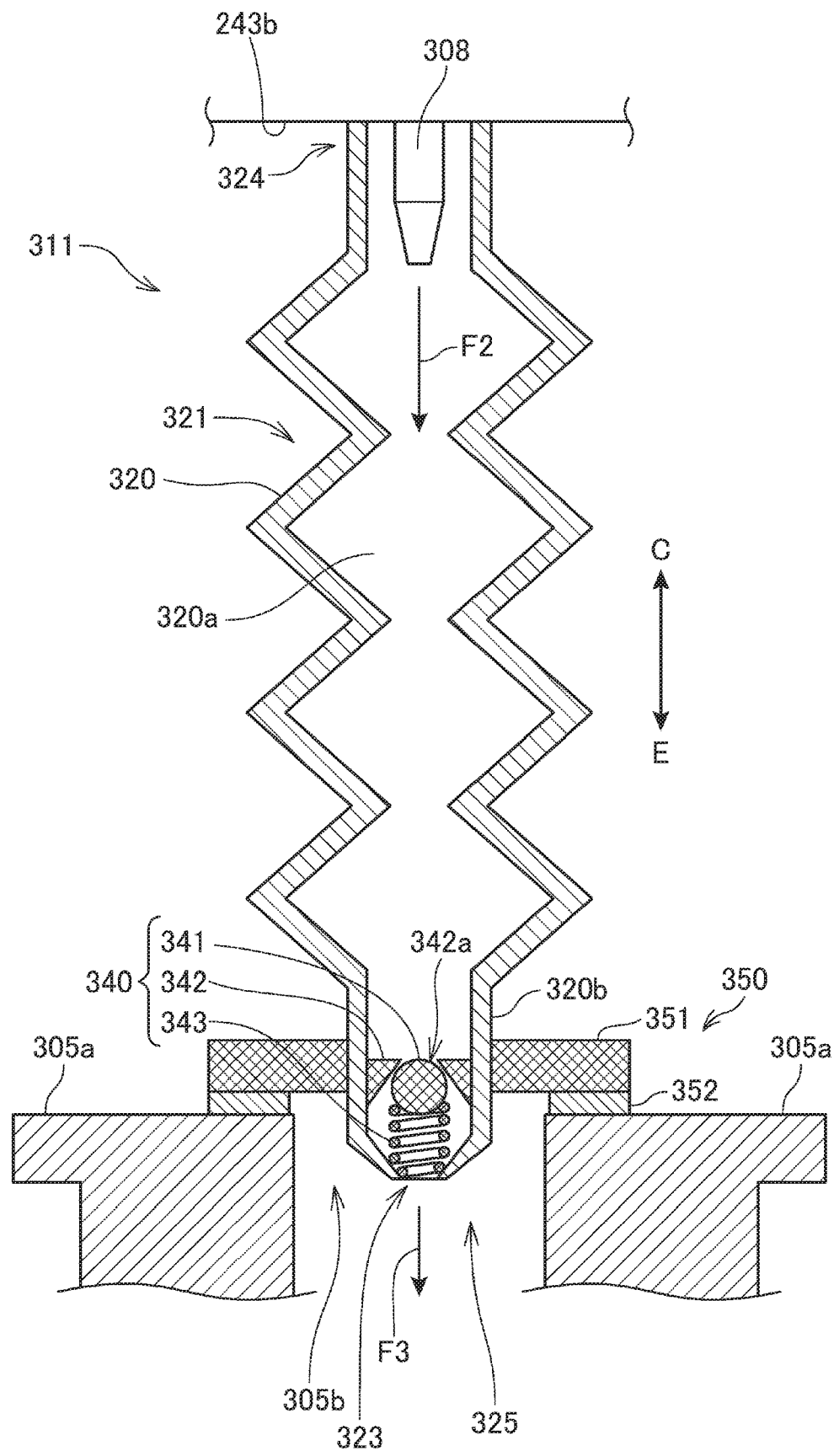
FIG. 5 is a section view showing main parts of the configuration of a second embodiment of an injector.

FIG. 5 is a section view showing main parts of the configuration of an injector 311 according to the second embodiment of the invention, and is a vertical section view along the long axis of the injector 311.

The injector 311 of the second embodiment is used in the first dust collector 27 instead of the injector 310 described above (FIG. 4). Note that further description of parts that are the same as in the first embodiment is omitted in the following description of the second embodiment.

This injector 311 uses seal 350 instead of the seal 330 of the injector 310 described above. The distal end of the expandable duct 320 of the seal 350 is referred to as injection nozzle 325. This injection nozzle 325 has an injection opening 323 as in the injection nozzle 322 described above, and injects backwash current F3 from the injection opening 323.

The seal 350 has a disk 351, and a seal 352 affixed to the disk 351. The disk 351 and the seal 352 each have a round hole, and are attached to the bellows 321 with the tubular part 320b fit into the hole. The seal 350 is an example of a closure.

The seal 352 is made from a flexible material such as a synthetic resin (including elastomers) or rubber, forming a seal. When the seal 352 is in contact with the top 305a, the seal 352 is held tight to the edge of the top 305a, and closes the opening 305b. The disk 351 is a rigid member affixed to the tubular part 320b and capable of supporting the seal 352.

As in the first embodiment, the expandable duct 320 has a bellows 321, injection opening 323, base 324, and a valve 340.

When the pressure in the air chamber 320a reaches the first pressure and the bellows 321 expands, the injection nozzle 325 moves toward the top 305a by expansion of the bellows 321. When the seal 350 meets the top 305a, further expansion of the bellows 321 is limited. Because the bellows 321 does not expand thereafter, the pressure inside the air chamber 320a increases if the compressed air nozzle 308 continues injecting compressed air. As a result, when the pressure in the air chamber 320a reaches the second pressure, the valving element 341 moves to the injection opening 323 side, and the valve opening 342a opens. As a result, compressed air is injected from the injection opening 323.

With the seal 350 in contact with the top 305a, the seal 352 contacts the edge area around the opening 305b. Because the seal 352 is pushed against the top 305a by the pressure in the air chamber 320a, the opening 305b is closed by the seal 350. As a result, the majority of the backwash current F3 is sent into the internal space 306 without leaking into the internal space 243c, and removes the third screened material from the filter member 305.

As a result, a configuration using the injector 311 of the second embodiment in the first dust collector 27 can achieve the same effect as the configuration described in the first embodiment.

3. Embodiment 3

Figure 6:
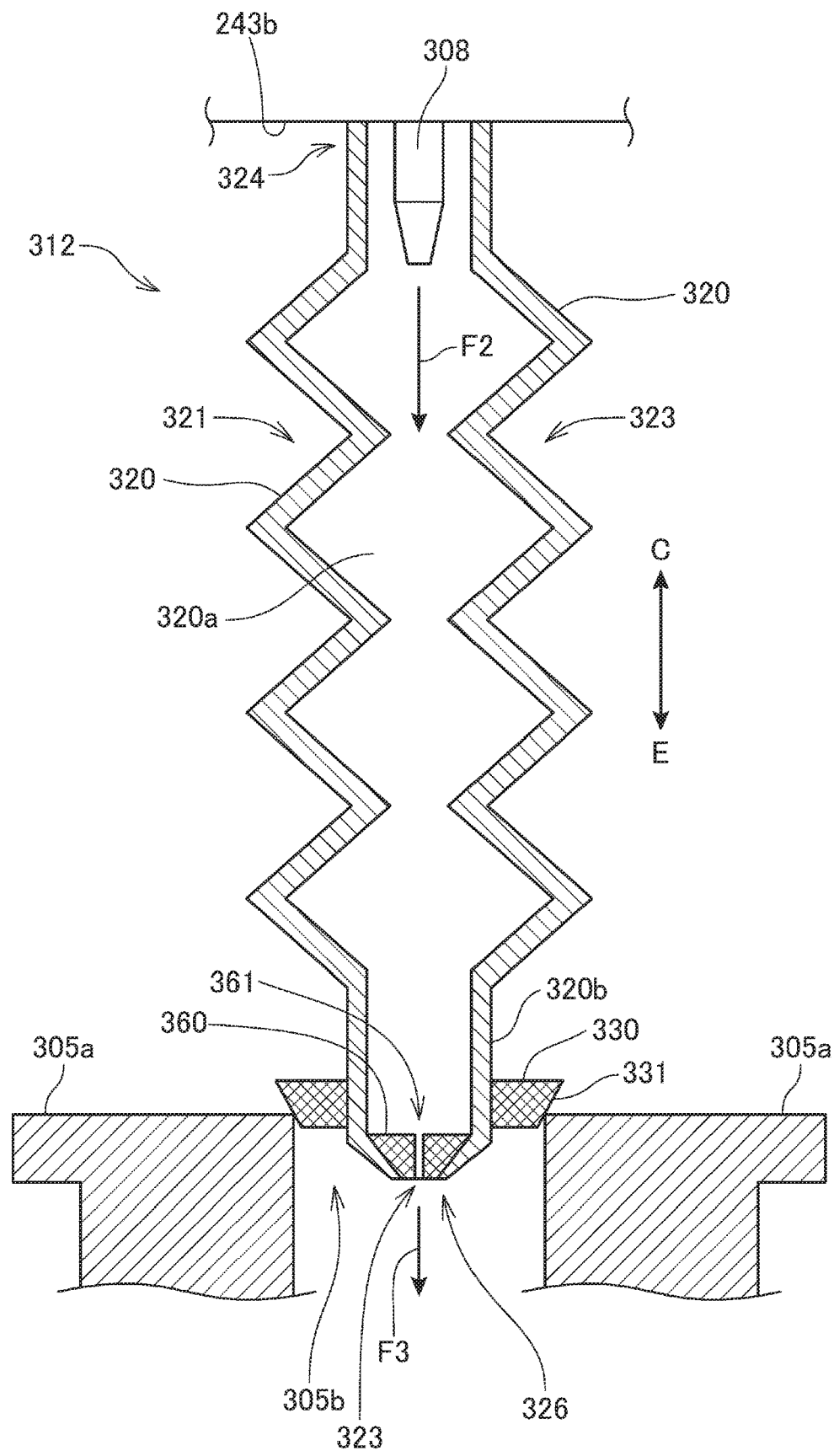
FIG. 6 is a section view showing main parts of the configuration of a third embodiment of an injector.

FIG. 6 is a section view showing main parts of the configuration of an injector 312 according to the third embodiment of the invention, and is a vertical section view along the long axis of the injector 312.

The injector 312 of the third embodiment is used in the first dust collector 27 instead of the injector 310 described above (FIG. 4). Note that further description of parts that are the same as in the first or second embodiments is omitted in the following description of the third embodiment.

This injector 312 uses a flow limiter block 360 instead of the valve 340 in the injectors 310, 311 described above. The distal end of the expandable duct 320 comprising this flow limiter block 360 is the injection nozzle 326. This injection nozzle 326 has an injection opening 323 as in the injection nozzles 322, 325 described above, and injects backwash current F3 from the injection opening 323.

The flow limiter block 360 is disposed to the distal end side of the air chamber 320a, and is fixed inside the injection nozzle 326. The material and shape of the flow limiter block 360 are not specifically limited, and the flow limiter block 360 is equivalent to a valve mechanism.

The flow limiter block 360 is an orifice block having an orifice 361 passing from the air chamber 320a to the injection opening 323. The sectional area of the orifice 361 is sufficiently smaller than the sectional area of the air chamber 320a and the sectional area of the injection opening 323. As a result, the flow limiter block 360 applies sufficient flow resistance to air moving from the air chamber 320a to the injection opening 323.

When the compressed air nozzle 308 injects the air current F2 to the air chamber 320a, the pressure inside the air chamber 320a rises. This operation allows compressed air to flow from the air chamber 320a to the injection opening 323, and because the flow resistance of the orifice 361 is sufficiently great, the orifice 361 does not interfere with increasing the pressure inside the air chamber 320a. When the pressure inside the air chamber 320a reaches the first pressure, the bellows 321 expands and moves the injection nozzle 322 toward the opening 305b. The bellows 321 functions as a moving mechanism that moves the injection nozzle 322 in this operation.

When the bellows 321 expands and the seal 330 meets the top 305a, further expansion of the bellows 321 is limited. Because the bellows 321 does not expand thereafter, the pressure inside the air chamber 320a increases if the compressed air nozzle 308 continues injecting compressed air. As the pressure inside the air chamber 320a increases, the pressure and volume of the backwash current F3 flowing through the orifice 361 into the internal space 306 increase, cleaning the filter member 305.

As a result, a configuration using the injector 312 of the third embodiment in the first dust collector 27 can achieve the same effect as the configuration described in the first embodiment.

4. Embodiment 4

Figure 7:
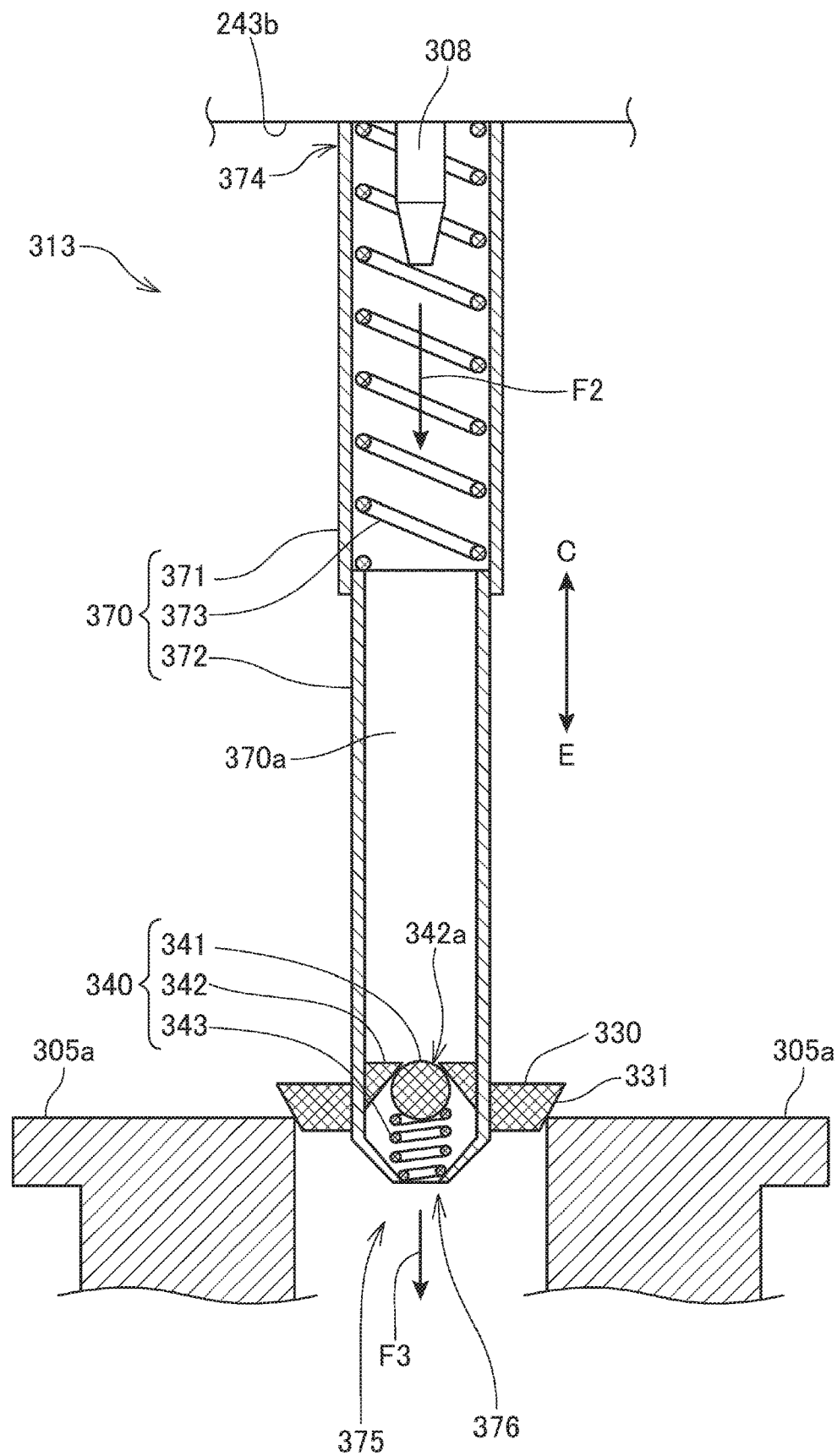
FIG. 7 is a section view showing main parts of the configuration of a fourth embodiment of an injector.

FIG. 7 is a section view showing main parts of the configuration of an injector 313 according to the fourth embodiment of the invention, and is a vertical section view along the long axis of the injector 313.

The injector 313 of the fourth embodiment is used in the first dust collector 27 instead of the injector 310 described above (FIG. 4). Note that further description of parts that are the same as in the first to third embodiments is omitted in the following description of the fourth embodiment.

This injector 313 has an expansion tube 370 instead of an expandable duct 320.

The expansion tube 370 includes an outside tube 371, an inside tube 372, and a spring member 373.

The outside tube 371 and inside tube 372 are hollow rigid tubes, and the inside tube 372 is housed slidably inside the outside tube 371. The outside tube 371 and inside tube 372 may be disposed with no space between the inside surface of the outside tube 371 and the outside surface of the inside tube 372, or with a small gap therebetween. The outside tube 371 and inside tube 372 are preferably round or oval in horizontal section, but may be polygonal. This expansion tube 370 is another example of an expansion member.

The base 374 of the outside tube 371 is affixed to the top 243*b*, and the compressed air nozzle 308 is housed inside the outside tube 371. The spring member 373 is a tension spring disposed inside the outside tube 371, the top end of the spring member 373 is affixed to the outside tube 371 or the top 243*b*, and the bottom end is affixed to the inside tube 372. The inside tube 372 is pulled up by the elastic tension of the spring member 373. As a result, the inside tube 372 is housed with at least part thereof inside the outside tube 371 and held in a retracted position. When an external force resisting the tension of the spring member 373 acts in the direction pushing the inside tube 372 down, the inside tube 372 moves in the direction of arrow E, and the expansion tube 370 expands (extends).

The internal spaces of the outside tube 371 and inside tube 372 are connected, forming an air chamber 370*a* into which compressed air is injected from the compressed air nozzle 308.

An injection nozzle 375 is formed at the distal end of the inside tube 372. The injection nozzle 375 is configured as a separate member from the inside tube 372, but may be connected to the inside tube 372. The injection opening 376 may be formed in unison with the inside tube 372.

The distal end of the injection nozzle 375 is tapered, and an injection opening 376 is formed in the distal end. A seal 330 is attached to the outside of the injection nozzle 375. A valve 340 is disposed inside the expansion tube 370, that is, at the distal end of the air chamber 370*a*. If the distal end of the injection nozzle 375 is tapered, the directivity of the backwash current F3 can be improved. If the opening in the distal end of the injection nozzle 375 is shaped to become wider, the backwash current F3 can be dispersed.

When the compressed air nozzle 308 is not injecting compressed air, the expansion tube 370 is held in the retracted position by the tension of the spring member 373. When the compressed air nozzle 308 injects compressed air and the pressure inside the air chamber 370*a* increases, the expansion tube 370 expands in the direction of arrow E in resistance to the contraction force of the spring member 373, and the injection opening 376 moves. The pressure inside the air chamber 370*a* required to cause the expansion tube 370 to expand is referred to as a first pressure.

When the expansion tube 370 expands and the seal 330 contacts the top 305*a*, further expansion of the expansion tube 370 is limited. Because the expansion tube 370 does not expand thereafter, the pressure inside the air chamber 370*a* increases if the compressed air nozzle 308 continues injecting compressed air. As a result, when the pressure in the air chamber 370*a* reaches the second pressure, the valving element 341 moves to the injection opening 376 side, and the valve opening 342*a* opens. As a result, compressed air is injected from the injection opening 376. Because the air chamber 370*a* is pressurized to the second pressure, the pressure of the compressed air injected from the injection opening 376 is high.

With the seal 330 in contact with the top 305*a*, the seal face 331 contacts the edge of the opening 305*b*. Because the seal face 331 is pushed against the top 305*a* by the pressure in the air chamber 370*a*, the opening 305*b* is closed by the seal 330. As a result, the majority of the backwash current F3 is sent into the internal space 306 without leaking into the internal space 243*c*, cleaning the filter member 305.

As a result, a configuration using the injector 313 of the fourth embodiment in the first dust collector 27 can achieve the same effect as the configuration described in the first embodiment.

5. Other Embodiments

The embodiments described above are only examples of specific embodiments of the invention as described in the accompanying claims, do not limit the invention, and can be varied in many ways as described below without departing from the scope and spirit of the invention as described in the accompanying claims.

The foregoing embodiments describe configurations applying the collection device and collector of the invention to the first dust collector 27 that suctions and removes third screened material from material separated by the classifier 40. However, the invention is not limited to this configuration, and the second dust collector 67 may be configured as a collection device identical to the first dust collector 27 described in the first to fourth embodiments described above.

The second collection blower 68 may also be configured identically to the first collection blower 28 shown in FIG. 3. The material captured by the second collection blower 68 is fiber and particles wiped from the mesh belt 72 by the belt cleaning mechanism 65. In this case, the effect achieved by applying the invention to the second dust collector 67 is the same as the first dust collector 27. In this case, the belt cleaning mechanism 65 is an example of a separator.

In addition, configurations having both a first dust collector 27 and second dust collector 67, or only one of the first dust collector 27 and second dust collector 67, are also conceivable. When discharging particles and fiber with the air current in the sheet manufacturing apparatus 100, the collection device and collector of the invention can be applied to all configurations for capturing particles and fiber from the air current.

The invention is not limited to the first to fourth embodiments described above, and may be configured with the expandable duct 320 and expansion tube 370, seal 330 and seal 350, and valve 340 and flow limiter block 360 in other combinations.

More specifically, the first embodiment describes an injector 310 configured with a seal 330 and valve 340 disposed to the expandable duct 320. The second embodiment describes an injector 311 configured with a seal 350 and valve 340 disposed to the expandable duct 320. The third embodiment describes an injector 312 configured with a seal 330 and flow limiter block 360 disposed to the expandable duct 320. The fourth embodiment describes an injector 313 configured with a seal 330 and valve 340 disposed to an expansion tube 370. The invention is not limited to these configurations, and may be configured with various other combinations.

For example, the injector may be configured with seal 330 and flow limiter block 360 disposed to the expandable duct 320. Alternatively, the injector may be configured with seal 330 and flow limiter block 360 disposed to the expansion tube 370, or with seal 350 and valve 340 disposed to the expansion tube 370. The injector may also be configured with seal 350 and flow limiter block 360 disposed to the expansion tube 370.

The size of the openings in the filter member 305 of the first dust collector 27 may be determined as desired, and the filter member 305 may be made from nonwoven cloth, a porous ceramic, a sponge, or other porous material. The material used for members of the expandable duct 320, expansion tube 370, and first dust collector 27 can also be selected as desired.

Furthermore, the compressed air nozzle 308 described in the foregoing embodiments may be any configuration capable of injecting (discharging) compressed air supplied by the compressor 281, and may be configured to discharge compressed air from multiple openings.

Furthermore, the gas supplied from the compressor 281 and injected by the compressed air nozzle 308 is not limited to air, and may be nitrogen, argon, or other inert gas, or oxygen or other gas.

The mechanism for moving the injection nozzle 322 toward the opening 305b is not limited to a expandable duct 320 or expansion tube 370, and may be configured otherwise. Preferably, the moving mechanism operates in response to the pressure of the compressed air the compressed air nozzle 308 injects.

The sheet manufacturing apparatus 100 is also not limited to manufacturing sheets S, and may be configured to make rigid sheets or paperboard comprising laminated sheets, or other web products. The manufactured product is also not limited to paper, and may be nonwoven cloth. The properties of the sheets S are also not specifically limited, and may be paper products that can be used as recording, writing, or printing on (such as copier paper, plain paper); wall paper, packaging paper, color paper, drawing paper, or bristol paper. When the sheet S is nonwoven cloth, it may be common nonwoven cloth, fiber board, tissue paper, kitchen paper, vacuum filter bags, filters, liquid absorption materials, sound absorption materials, cushioning materials, or mats.

The foregoing embodiments describe a sheet manufacturing apparatus 100 that acquires material by defibrating feedstock in air, and makes sheets S using this material and resin, as an example of a fibrous feedstock recycling device according to the invention. Application of the invention is not limited to such a device, however, and can be applied to a wet process sheet manufacturing apparatus that creates a solution or slurry of feedstock containing fiber in water or other solvent, and processes the feedstock into sheets. The invention can also be applied to an electrostatic sheet manufacturing apparatus that causes material containing fiber defibrated in air to adhere to the surface of a drum by static electricity, for example, and then processes the feedstock adhering to the drum into sheets.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No: 2018-17842, filed Feb. 5, 2018 is expressly incorporated by reference herein.

What is claimed is:

1. A collection device comprising:
a housing into which a gas carrying capture material is carried;
a filter having a filter element that captures the capture material, and a filter opening from which air passing through the filter element flows out; and
an injector having a nozzle with an injection opening that injects a gas, moves the nozzle to a position in contact with the filter opening, and injects the gas from the injection opening when the nozzle is in contact with the filter opening, wherein:
the injector has a gas chamber to which a gas is supplied, and in response to pressure of the gas supplied to the gas chamber, expands and moves the nozzle toward the filter opening;
the injector and the nozzle are connected, and communicate the injection opening with the gas chamber,
the injector expands and moves the nozzle when pressure in the gas chamber reaches a first pressure;
the nozzle has a valve mechanism that moves the gas from the gas chamber to the injection opening when the pressure in the gas chamber reaches a second pressure; and
the second pressure is a pressure greater than the first pressure.

2. The collection device described in claim 1, wherein:
the nozzle has a closure configured to contact the filter opening and close the filter opening when moved to the filter opening.

3. The collection device described in claim 1, wherein:
when the nozzle is in contact with the filter opening, gas supplied to the injector is injected from the injection opening.

4. The collection device described in claim 1 wherein:
the injector has an expansion member disposed integrally with the base of the nozzle, or connected to the base;
the expansion member is configured to expand when the pressure in the gas chamber reaches the first pressure; and
the nozzle has a valve mechanism held in a closed position by elastic force of a spring member, and when the gas pressure in the gas chamber reaches a second pressure, the spring member deforms and gas is injected from the injection opening.

5. The collection device described in claim 1, comprising:
multiple filters in the housing;
multiple injectors corresponding to the multiple filters; and
a gas supplier configured to supply gas to each of the multiple injectors;
the collection device sequentially selecting a specific number of the multiple injectors, and supplying gas from the gas supplier.

6. A fibrous feedstock recycling device comprising:
a defibrator configured to defibrate material containing fiber;
a separator configured to separate defibrated material defibrated by the defibrator into first screened material containing the fiber, and second screened material containing components smaller than the fiber;
a manufacturing device configured to make a recycled product from the first screened material separated by the separator; and
a collector configured to capture the second screened material separated by the separator, wherein:
the collector includes a housing into which a gas carrying the second screened material is carried;
a filter has a filter element that captures the second screened material, and a filter opening from which air passing through the filter element flows out; and
an injector has a nozzle with an injection opening that injects a gas, moves the nozzle to a position in contact with the filter opening, and injects the gas from the injection opening when the nozzle is in contact with the filter opening,
the injector has a gas chamber to which a gas is supplied, and in response to pressure of the gas supplied to the gas chamber, expands and moves the nozzle toward the filter opening,
the injector and the nozzle are connected, and communicate the injection opening with the gas chamber,
the injector expands and moves the nozzle when pressure in the gas chamber reaches a first pressure;

the nozzle has a valve mechanism that moves the gas from the gas chamber to the injection opening when the pressure in the gas chamber reaches a second pressure; and the second pressure is a pressure greater than the first pressure.

* * * * *